UNITED STATES PATENT OFFICE.

CHARLES Y. BEACH, OF FAIRFIELD, CONNECTICUT.

INDIA-RUBBER AND OTHER GUM COMPOUNDS FOR SURFACING CLOTH AND FOR OTHER PURPOSES.

SPECIFICATION forming part of Letters Patent No. 226,017, dated March 30, 1880.

Application filed January 21, 1880.

*To all whom it may concern:*

Be it known that I, CHARLES YALE BEACH, of Fairfield, in the county of Fairfield and State of Connecticut, have invented new and useful Improvements in India-Rubber and other Gum Compounds for Surfacing Cloth and for other purposes, of which the following is a specification.

This invention has for its object to overcome the objectionable odor commonly present in goods that are made wholly or partly of rubber or other gum compounds.

My invention relates to the preparation of rubber and other gum compounds for general use in the arts; but in the following specification I shall chiefly confine myself to a description of the application of my discovery as used in surfacing cloth and other fabrics with rubber or other gum compounds.

Two kinds of these goods are at present manufactured, in one of which the rubber or other gum compound, with which sulphur is mixed, is rolled into sheets, then pressed upon the cloth, and vulcanized by heat. For the other class of goods the rubber or gum compound, without sulphur, is dissolved and spread in a thin film upon the cloth. The solvent is then allowed to evaporate, which leaves a thin coating of the rubber or other gum compound upon the surface of the cloth, and requires no vulcanization. The well-known water-proof "gossamer" fabrics are made in this way.

The object of my invention is to deodorize the rubber or other gum compounds and improve the qualities of goods made therefrom.

My invention is applicable to the manufacture of both of the above-mentioned classes of rubber or gum compounds and to both of said kinds of goods; and it consists in the combination, with the rubber or gum compounds, of some substance composed of or containing benzoic acid, the substance which I prefer to use in said combination being gum-benzoin.

I will first describe the use of my invention as applied to the manufacture of a class of goods in which the rubber or other gum compound is vulcanized, and will then describe the use of my invention as applied to the manufacture of a class of goods in which the rubber or other gum compound is not vulcanized.

In the manufacture of vulcanized cloth, for example, the india-rubber or other gum compound, after having been ground and washed, is then charged with sundry other substances as mixers, and with sulphur for vulcanization, by placing said substances upon the rubber or gum and submitting the mass to pressure between rollers, the rolling operation being repeated and continued until the said substances have become thoroughly incorporated with the rubber or other gum compound. I make use of my invention during the above stage of the preparation of the rubber or gum compound, before the said rolling or mixing operation is completed, by combining with the rubber or other gum compound, sulphur, and other mixers a small quantity of gum-benzoin—say about five per cent. of gum-benzoin. If, for example, the gross weight of the rubber or other gum compound, sulphur, and mixers is one hundred pounds, I add thereto five pounds of gum-benzoin, and the whole mass is then thoroughly mixed together by rolling in the usual manner.

The rubber or other gum compound, with the gum-benzoin incorporated therewith, as stated, is next rolled into a very thin sheet and laid upon the surface of the cloth or fabric that is to be surfaced with the compound, and both cloth and rubber sheet are then passed between heated rollers and subjected to such great pressure that the compound and fabric are caused firmly to adhere. The goods so prepared are then submitted to the usual heating or vulcanizing process in a hot chamber until the sulphur acts sufficiently upon the rubber or other gum compound.

The vulcanized rubber sheets, cloth, fabrics, or other goods made as above described without the use of my improvement have a disagreeable odor, which is apt to be so offensive as to cause the rejection of such goods from many uses to which otherwise they would be particularly adapted—for example, for hospital and sick-room purposes, household coverings and linings, wearing-apparel, &c.

The use of my invention in connection with the manufacture of the said goods as described not only removes the said disagreeable and offensive odor, but also imparts to the finished goods an agreeable aroma, and the vulcanized goods, sheets, and fabrics prepared by means of my invention are rendered desirable in all those cases where the ordinary goods are now rejected.

I am unable at present fully to explain the precise nature of the reaction which takes place in the rubber or other gum compound by the addition of the gum-benzoin; but I am inclined to believe that the benzoic acid contained in the gum-benzoin produces a slight alteration in the hydrocarbons of the rubber or other gum, by which the bad odor mentioned is arrested and the appearance of the goods when finished is improved, while an agreeable aroma is imparted to the goods, probably by the essential oil which is known to be a constituent of gum-benzoin.

In the application of my improvement to the manufacture of non-vulcanized goods, such as the gossamer fabrics, I make no change in the ordinary method of manufacture, except to add and grind in with the usual rubber or other gum compound, before it is submitted to the action of the solvent, about five per cent. of gum-benzoin—that is to say, if the rubber or gum compound or mass of rubber and other mixers (the sulphur in this form of the manufacture is omitted) weighs one hundred pounds, I grind in and thoroughly mix with the compound by the usual process five pounds of gum-benzoin. The mixed compound is then submitted to the action of benzine or other suitable solvent or diluent in the usual manner, and kept in a continual state of agitation by the usual stirring machinery until the whole forms a homogeneous mass having the consistency of a thick sirup. The mass is then spread in a thin film, by means of the usual mechanism, upon the surface of the cloth. The solvent is then allowed to evaporate.

The ordinary rubber or other gum-covered fabrics or goods prepared in this general manner have when finished a bad odor, which necessitates their rejection for many purposes, such as those hereinbefore mentioned; but when this class of goods is made with the addition of my improvement, as described, the bad odor mentioned is removed, the appearance of the goods is improved, and an agreeable aroma imparted thereto, substantially as I have hereinbefore described.

Although I have herein mentioned five per cent. as the quantity of gum-benzoin that is to be added to the rubber compound, I wish it to be understood that I do not limit or confine myself to that quantity, as the latter may be varied and more or less of the gum-benzoin used, as may be found desirable. Different kinds of rubber or rubber compounds will require variations in the quantity of gum-benzoin that is added. The gum-benzoin is also more or less variable in quality, and hence the quantity used must accordingly be varied.

It will be readily understood from what I have stated concerning the action of the gum-benzoin that I might make use of benzoic acid alone, or other substances containing benzoic acid, in lieu of gum-benzoin, and such substitutes are by me intended to be included within the scope of my invention as equivalents for the gum-benzoin. My present experience, however, leads me to prefer the use of gum-benzoin, as it contains not only benzoic acid, but also an aromatic essential oil.

Having thus described my invention, what I claim, and desire to secure by Letters Patent, is—

1. The method herein described of deodorizing rubber and other gum compounds by combining therewith gum-benzoin or its described equivalent, as set forth.

2. The composition for the manufacture of rubber or other gum goods consisting of rubber or other gum, prepared by admixture therewith of gum-benzoin or its equivalent, as described, substantially as set forth.

3. In the manufacture of india-rubber and other gum compounds, the combination therewith of gum-benzoin or its described equivalent, substantially as set forth.

4. In the manufacture of rubber or other gum-covered fabrics, the use of gum-benzoin or its described equivalent, substantially as set forth.

CHARLES YALE BEACH.

Witnesses:
J. KILEY,
JOHN F. NOBLE.